S. J. AND P. J. MISTALSKE.
SCREW DRIVER.
APPLICATION FILED SEPT. 3, 1921.
1,434,791.
Patented Nov. 7, 1922.
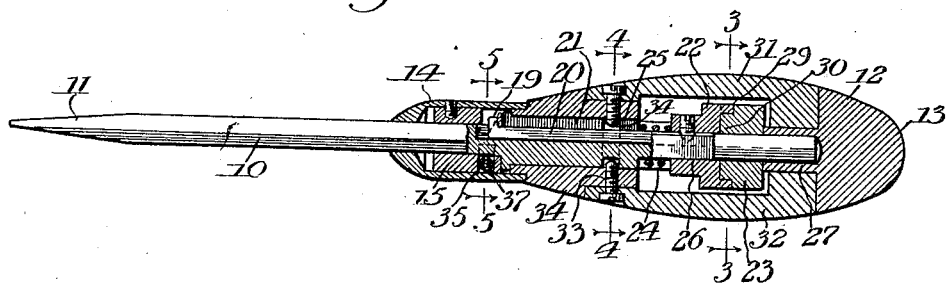
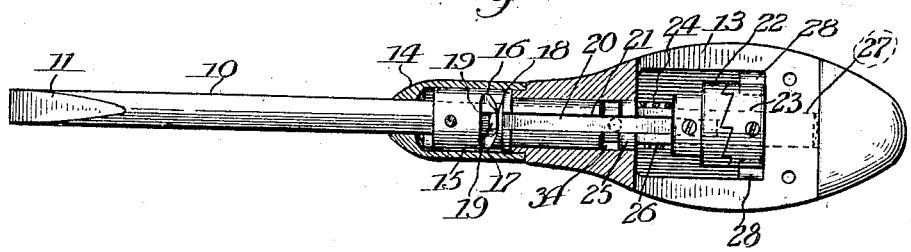
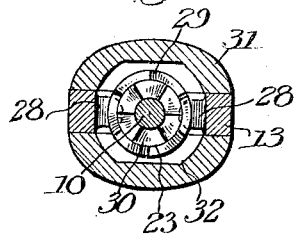
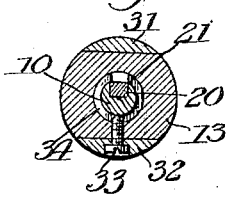
Inventors
Stanley J. Mistalske
Peter J. Mistalske
by Otto M. Wermuth
Atty.

Patented Nov. 7, 1922.

1,434,791

UNITED STATES PATENT OFFICE.

STANLEY J. MISTALSKE AND PETER J. MISTALSKE, OF CHICAGO, ILLINOIS.

SCREW DRIVER.

Application filed September 3, 1921. Serial No. 498,232.

*To all whom it may concern:*

Be it known that we, STANLEY J. MISTALSKE and PETER J. MISTALSKE, both citizens of the United States, residing at Chicago, in the county of Cook and State of Illinois, have invented a certain new and useful Improvement in Screw Drivers, of which the following is a full, clear, concise, and exact description, reference being had to the accompanying drawings, forming a part of this specification.

The invention relates to improvements in screw drivers and has among its various objects the provision of a construction which will simulate the ordinary device of this character in shape and size and which is capable of being manipulated to lock and release the shank with relation to the handle and to permit the shank and handle to rotate with each other or freely, relatively to each other, as desired.

It is an object of the invention to arrange the portion which is operable to effect a locking and releasing of the parts at a convenient position, so that it is readily accessible to effect this locking, and to also serve as a means whereby the shank may be rotated with relation to the handle while the screw driver is held in the hand and operated to start the driving of the screw or to complete its extraction.

It is a further object to provide a construction which will release the locking mechanism and permit the shank to be rotated to either the right or left, depending upon whether the screw is to be driven or extracted.

The particular structure illustrated in the drawings includes a handle and a shank. A rotatable cam actuating element is arranged upon the shank adjacent one end of the handle, and preferably at a position at which it is convenient for actuation by the thumb and index finger of the hand while the handle is arranged in the palm. This cam actuating element cooperates with and actuates a slidable member which has one part of a clutch mechanism secured to it which cooperates with another clutch member which is stationarily mounted with respect to the handle. A means is provided for maintaining the clutch elements in connected relation so that the shank and handle may be rotated with each other when the cam actuating element is arranged to permit this. The cam actuating element is rotatable to the right or left and the cam is constructed to release the clutch from its connected relation when this element is moved in either direction, the clutch being again connected when the clutch actuating element is rotated to a certain position in the reverse direction. A further movement of the cam actuating element in the same direction causes the clutch to become disengaged which allows the shank to be moved with relation to the handle.

The invention will be explained and more readily understood when read in conjunction with the accompanying drawings, in which is illustrated one embodiment of the invention, it being understood, however, that changes and modifications may be resorted to without departing from the spirit of the appended claims forming a part hereof.

In the drawings Figure 1 is a central sectional view of a screw driver constructed according to one embodiment of the invention;

Fig. 2 is a plan section of the structure shown in Fig. 1;

Fig. 3 is a section taken on line 3—3 of Figure 1;

Fig. 4 is a section taken on line 4—4 of Fig. 1; and

Fig. 5 is a section taken on line —5— of Fig. 1.

In the structure illustrated the screw driver shank 10 consists of a single piece of suitable metal having a screw engaging end 11. The opposite end thereof extends into the handle 12, it being mounted in the framework 13. A cam actuating element 14 is arranged for rotation upon the shank and is arranged at the end of the framework 13 between the innermost end of the handle and the extremity or screw engaging end of the shank, so that it is accessible for manipulation by the thumb and index finger while the handle is held in the palm of the hand of the hand to release or rotate the shank. This element 14 is of a sleeve-like construction and encloses and has secured to it the member 15 which is rotatable upon the shank 10 by means of this sleeve. This member 15 is provided with the cam faces 16 and 17 and a neutral point 18 which cooperate with the projection 19 of the slidable element 20 which operates in the slotted guideway 21 provided in the shank 10. This slidable element has one part 22 of a clutch secured to it which is moved out of engagement with a stationary cooperating clutch element 23 by the cam faces 16 and 17, it being maintained in clutched relation by means of the coiled spring 24 which reacts between the clutch element 22 and the collar 25, the latter being part of the shank. The portion 26 of the shank upon which the clutch element 22 slides is preferably square so as to relieve the slidable element 20 and to afford the necessary strength to withstand the rotating motion imparted to the shank from the handle when the clutch elements are in clutched relation to each other.

The extreme end of the shank adjacent the handle is round and is journaled in the frame 13 at 27. This clutch element 23 is mounted upon this portion and is held against movement relatively to the frame 13 by means of the lugs or projections 28—28 which extend from the frame into recesses provided in this clutch portion. The cooperating faces of the clutch members are each provided with oppositely disposed ratchet teeth 29 and 30, which cooperate with each other and transmit the rotating motion of the handle to the shank when said handle is moved in either direction. The portions forming the handle include the frame 13 and the side portions 31 and 32 which are secured to the frame by means of screws. One of these screws as 33, extends into a recess 34 provided in a part of the shank and holds the shank against separation from the handle 12.

The rotatable element 15 having the cam portions is provided with a cutaway portion 35 and the portion forming the shank of the screw driver adjacent the element 15 is provided with an outwardly extending pin 36 which engages a coiled spring 37, the latter reacting between the pin and the shoulders 38 and 39 of the cutaway portion. This arrangement of elements is provided to assist in restoring and maintaining the rotatable element 14 in its normal or neutral position, in which position the clutch elements are in engagement with each other.

From the foregoing description of the structure it is manifest that upon a rotation of the rotatable element 14 and the cam element 15 in either direction from its neutral position that the slidable element 20 will be actuated, causing the clutch elements 22 and 23 to be separated from each other. At this time the projection 19 contacts with the shoulders provided by the termination of the cam faces 16 and 17 which causes the shank 10 to be rotated thereby and with respect to the handle 12 upon the rotation of the member 14; the shank being rotatably held relatively to the handle and against separation therefrom by means of the screw 33, the end of which is arranged in the annular recess 34.

It is further evident that by actuating the cam 15 so that the neutral point 18 of this cam allows the clutch elements to engage each other, that the shank and handle will be rotated together and relative rotation is prevented.

Having shown and described one embodiment of the invention, what we claim and desire to cover by Letters Patent is:

1. In a screw driver the combination of a handle, a shank carried thereby and means whereby said shank and handle may be releasably held against relative rotation said means being operable to permit relative rotation of said shank and handle, said means including an element operable to control the relative rotation of said shank and handle, and providing a means for rotating the shank relatively to the handle.

2. In a screw driver the combination of a handle, a shank carried by the handle, a means whereby said shank may be held against rotation with respect to the handle and released to permit said shank to be rotated freely relatively to the handle, said means including a member which is operable to control the holding or releasing of said shank and providing a means for rotating said shank when the holding means is released.

3. In a screw driver, the combination of a handle, a shank carried by the handle, and means including a clutch whereby said shank may be held against rotation with respect to the handle and released to permit said shank to be rotated freely relatively to the handle and a member operable to actuate the clutch and to rotate the shank upon the release of the clutch.

4. In a screw driver, the combination of a handle, a shank carried by the handle, and means including a cam rotatable axially of the shank whereby said shank may be held against rotation with respect to the handle and released to permit said shank to be rotated freely relatively to the handle said means having the cam being operable to rotate the shank.

5. In a screw driver, the combination of a handle, a shank carried by the handle, and means including a cam rotatable axially of the shank and a clutch, said clutch being operable lengthwise of the shank by said cam whereby said shank may be releasably held with respect to said handle.

6. In a screw driver, the combination of a handle, a shank carried by the handle and means whereby said shank may be held against rotation with respect to the handle and released to permit said shank to be rotated freely relatively to the handle, said means including a member having a cam for controlling said means and being operable to cause the rotation of said shank.

7. In a screw driver, the combination of a handle, a shank carried by the handle and means whereby said shank may be held against rotation with respect to the handle and released to permit said shank to be rotated freely relatively to the handle, said means including a member having a cam and a clutch operated thereby, said member having the cam being operable to cause the rotation of said shank.

8. In a screw driver, the combination of a handle, a shank carried by the handle and means whereby said shank may be held against rotation with respect to the handle and released to permit said shank to be rotated freely relatively to the handle, said means including a member having a cam and a clutch operated thereby, said member having the cam being operable to cause the rotation of the shank upon the release of the clutch.

9. In a screw driver, the combination of a handle, a shank carried by the handle and means whereby said shank may be held against rotation with respect to the handle and released to permit said shank to be rotated freely relatively to the handle, said means including a rotatable member which is movable with respect to said shank to affect a release of said shank and to cooperate with said shank to cause its rotation.

In witness whereof, we hereunto subscribe our names this 24th day of August, A. D., 1921.

STANLEY J. MISTALSKE.
PETER J. MISTALSKE.